United States Patent
Spencer

(12) 
(10) Patent No.: US 6,861,962 B2
(45) Date of Patent: Mar. 1, 2005

(54) ELECTRONIC PINBALL

(76) Inventor: Jerrald D. Spencer, 1941 Lakemont, Spanish Lake, MO (US) 63138

( * ) Notice: Subject to any disclaimer, the term of this patent is extended or adjusted under 35 U.S.C. 154(b) by 445 days.

(21) Appl. No.: 10/152,094

(22) Filed: May 21, 2002

(65) Prior Publication Data

US 2003/0218552 A1 Nov. 27, 2003

(51) Int. Cl.[7] ............................................. H03M 11/00
(52) U.S. Cl. ................. 341/22; 273/119 A; 273/121 B; 273/129 S
(58) Field of Search .................... 341/22; 273/119 A, 273/121 B, 129 S, 129 V, 121 R; 463/3

(56) References Cited

U.S. PATENT DOCUMENTS 6,171,187 B1 * 1/2001 Audebert et al. ............. 463/37

* cited by examiner

*Primary Examiner*—Michael Horabik
*Assistant Examiner*—Hung Dang
(74) *Attorney, Agent, or Firm*—Polster, Lieder, Woodruff & Lucchesi

(57) ABSTRACT

A unit for converting a keypad operated electronic pinball game to a mechanically operated pinball machine includes a housing configured and dimensioned to enclose a keypad. The keypad has keys specific to functions of starting and stopping an electronic pinball game kicking a "ball", flipping the ball and tilting the machine to end a turn. Mechanisms are provided adapted to engage individual of the keys, and knobs extending out of the housing and connected to the mechanisms, permit the keys to be operated by manipulation of the knobs. Preferably the housing includes a base extending beneath the keypad and a cover portion hingedly mounted to the base, but constructed to permit sliding movement of the cover with respect to the base. A wedge mounted in the cover portion is adapted to engage the spacer bar of the keypad when the housing is moved forward with respect to the base, which serves to actuate the tilt function.

4 Claims, 4 Drawing Sheets

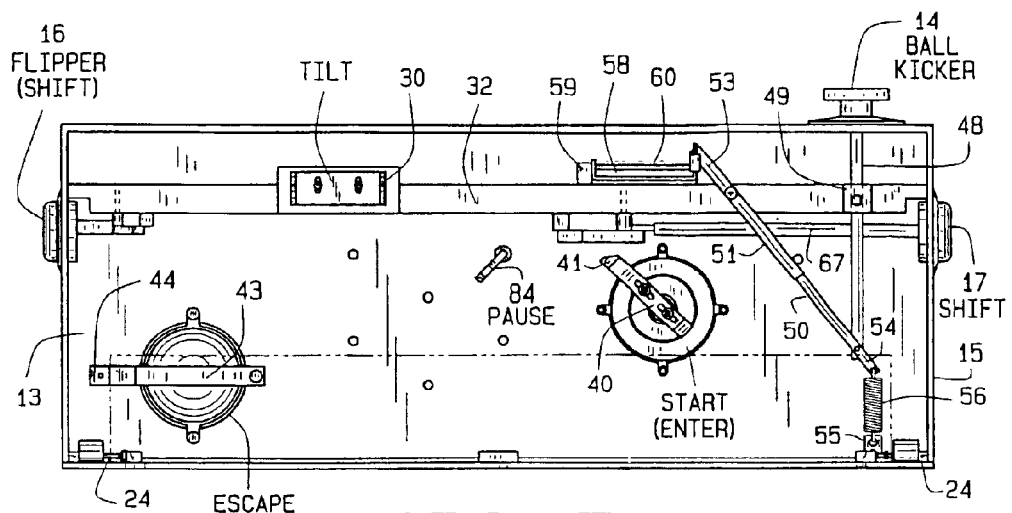
FIG. 7
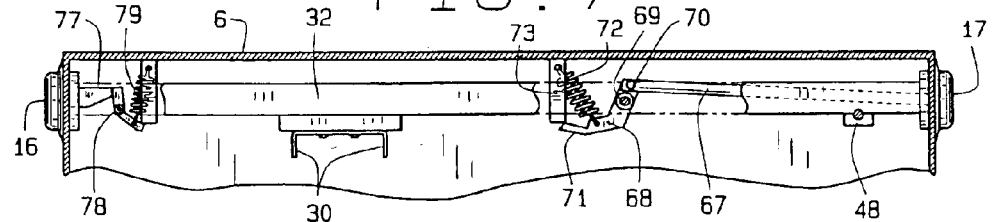
FIG. 8
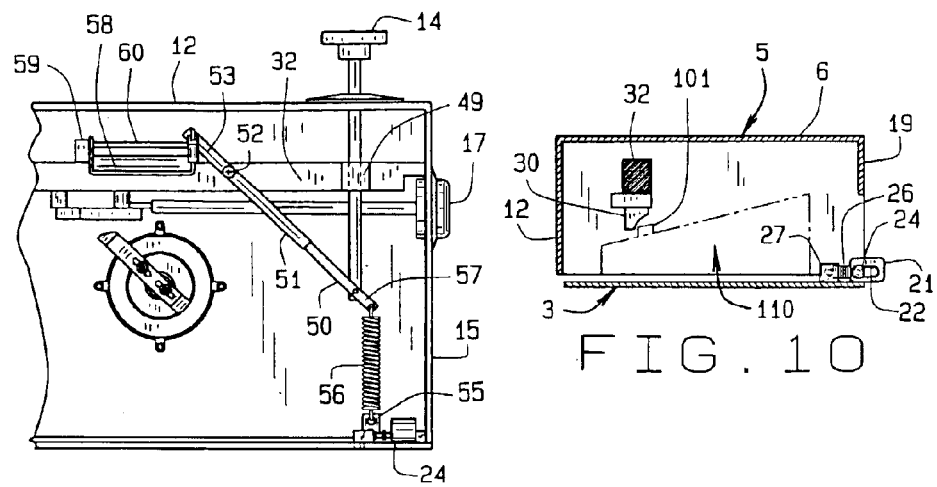
FIG. 9
FIG. 10

ELECTRONIC PINBALL

REFERENCE TO RELATED APPLICATIONS

STATEMENT REGARDING FEDERALLY SPONSORED RESEARCH OR DEVELOPMENT

Not Applicable.

BACKGROUND OF THE INVENTION

Much software is available for playing pinball type games electronically. For the most part, these different games are controlled by the same keys of the keypad, keys specific to functions of starting and stopping the pinball game, kicking a "ball", flipping the ball and tilting the machine to end a turn. In playing the game, the keys are simply depressed. Entertaining as these games may be, they lack the excitement of the manually operated pinball machine where movement of the machine can cause tilting, and where the manipulation of the buttons or knobs adds excitement to the play.

One of the objects of this invention is to restore some of the excitement of the play of a mechanical or manually operated pinball machine, but utilizing the software of an electronic pinball machine.

BRIEF SUMMARY OF THE INVENTION

In accordance with this invention, generally stated, a unit is provided for converting a keypad operated electronic pinball game to a mechanically operated pinball machine. The unit comprises a housing configured and dimensioned to enclose a keypad, the keypad having keys specific to functions of starting and stopping an electric pinball game, kicking a "ball", flipping the ball, and tilting the machine to end a turn. Mechanisms adapted to engage individual of the keypad keys are connected to knobs (which term is used herein also to include buttons) extending out of the housing. The appropriate keys are then operated by manipulating the knobs. In the embodiment shown, the housing is made up of a base which extends under the keypad and a cover which encloses the keypad. The cover is hinged to the base in such a way as to permit the cover to be slid forwardly against the bias of a spring, in which position a wedge mounted in the cover portion engages the spacer bar of the keypad to register a "tilt" and end the turn. The movement of the mechanisms in response to manipulation by the knobs is limited to preclude damage to the keys or keypad. The knob by which the ball is kicked to begin with, is on a rod which can be pulled in a direction away from the housing, against the bias of a spring, and released, much in the way a standard shooter of a mechanical pinball machine is operated.

BRIEF DESCRIPTION OF THE SEVERAL VIEWS OF THE DRAWINGS

In the drawing,

FIG. 7 is a bottom plan view of a cover portion of the housing in open position;

FIG. 8 is a fragmentary sectional view taken along the line 10—10 of FIG. 3;

FIG. 9 is a fragmentary bottom plan view corresponding to FIG. 7 with a ball shooter or kicker knob pulled out against a spring;

FIG. 10 is a sectional view taken along the line 7—7 of FIG. 3; and

DETAILED DESCRIPTION OF PREFERRED EMBODIMENT

Figure 1:
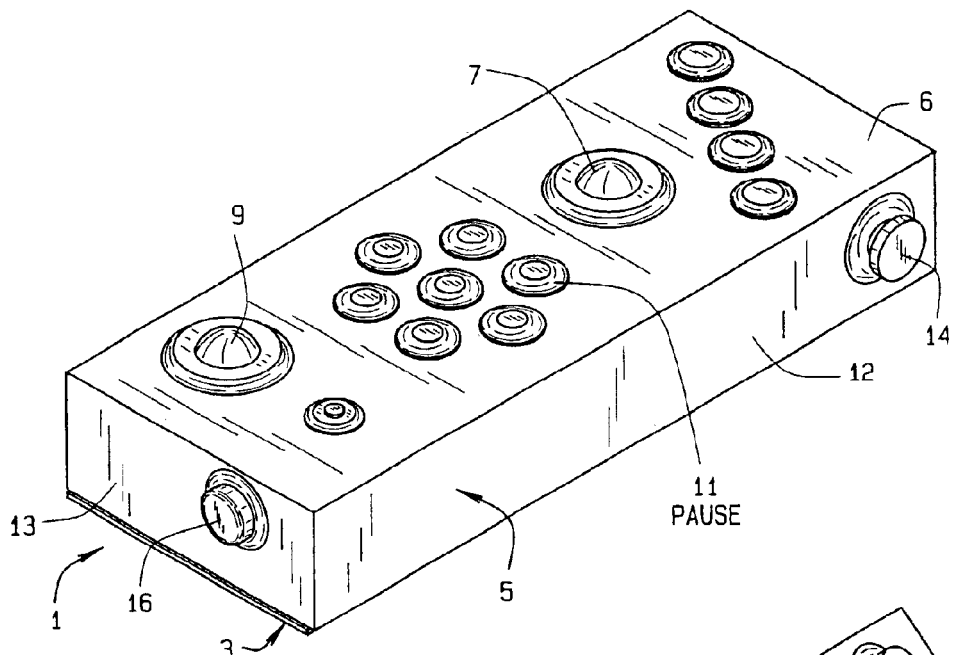
FIG. 1 is a view in perspective of a unit of this invention.
Figure 2:
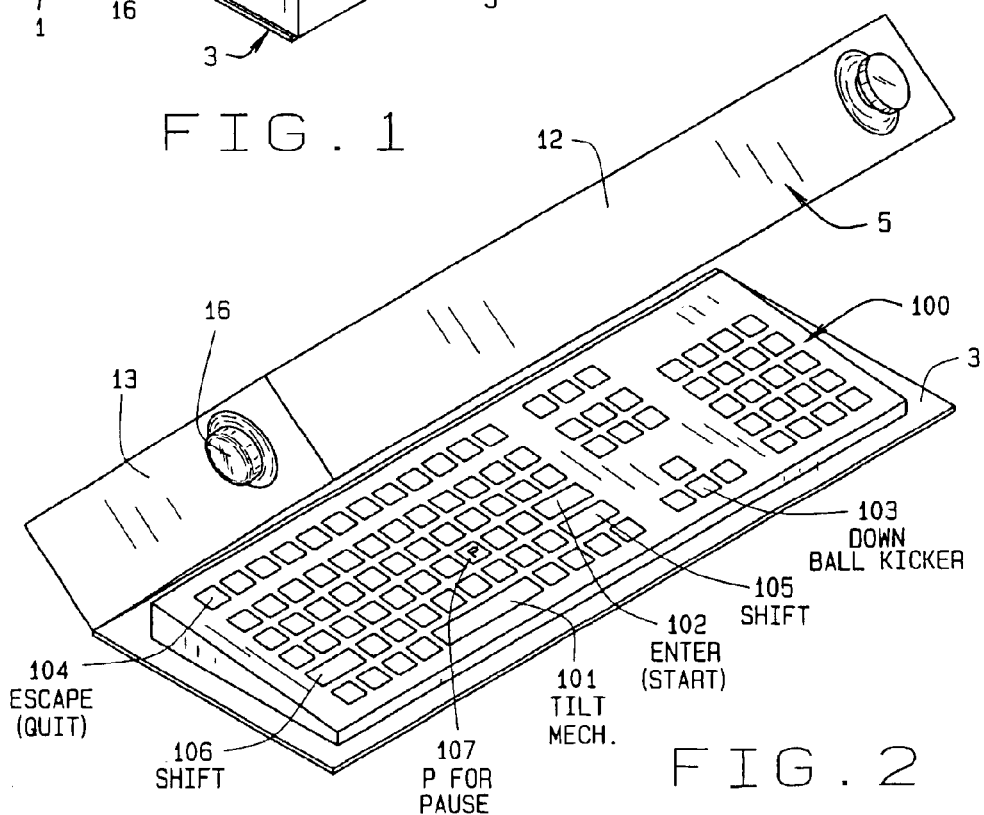
FIG. 2 is a view in perspective of the unit shown in FIG. 1 opened to display a keypad and a base.
Figure 3:
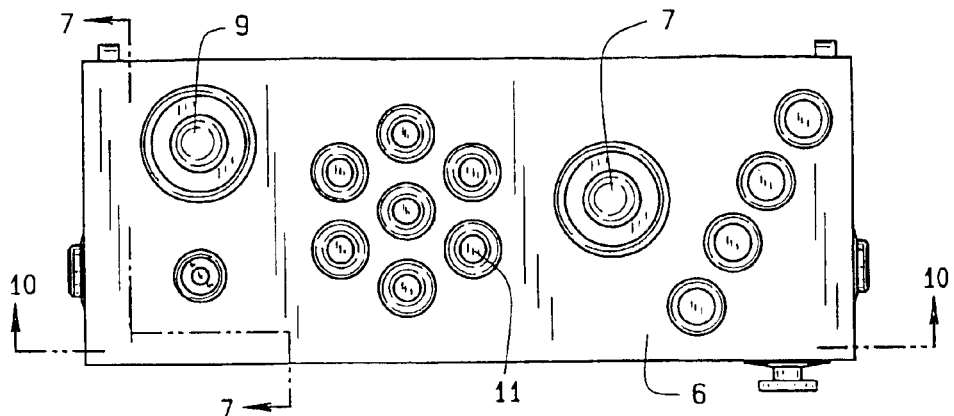
FIG. 3 is top plan view.
Figure 4:
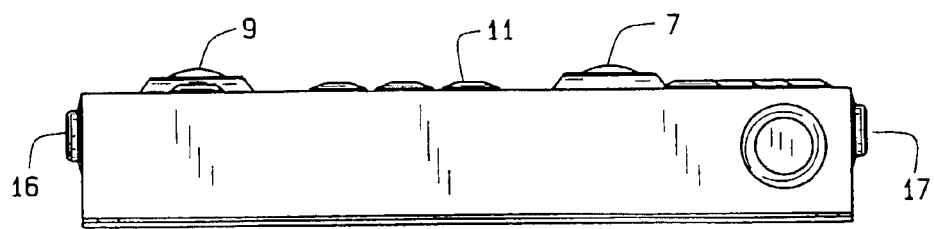
FIG. 4 is view in front elevation.
Figure 5:
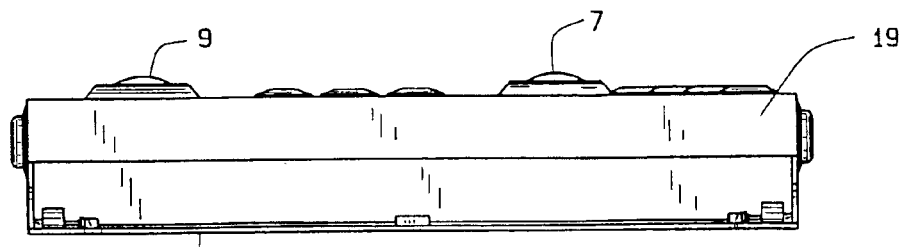
FIG. 5 is view in rear elevation.
Figure 6:
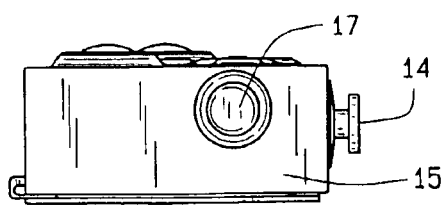
FIG. 6 is a view in end elevation, viewed from left to right of FIG. 3.

Referring now to the drawings for one illustrative embodiment of unit of this invention, reference numeral 1 indicates a unit having a base 3 and a cover 5. The cover 5 has a top wall 6, which carries a start button 7, a stop button 9, and a pause button 11, and a front wall 12, from which a ball kicker or projector knob 14 extends.

The cover has a left side wall 13 in which a flipper button 16 is mounted, and a right side wall 15 in which a flipper button 17 is mounted. The cover also has a back wall 19, along a bottom edge of which hinge pins 24 are mounted. The hinge pins 24 extend into and through a slot 22 in a hinge plate 21 fastened to an upper surface of the base 3. A helical tension spring 26 is mounted at one end on a bracket 27 secured to the base 3, and at its other end, is secured to a hinge pin 24, so that when the cover 6 is pushed forward against the bias of the spring 26, the hinge pin 24 slides in the slot 22, and when pressure is released from the cover, the spring 26 restores the cover to the position shown in FIG. 10.

A tilt wedge 30, which, in this embodiment consist of two wedge-shaped legs, is secured to a crossbeam 32 extending between and secured to the side walls 13 and 15 and positioned to engage a spacebar 101 of a keypad 100 resting on the base 3 when the cover is moved to its forward position. In the standard electronic pinball machine, the spacebar serves to actuate the tilt function.

A start arm 40, operated by the start button 7, has a finger 41 that engages an "enter" key 102 of the keypad 100. A springy stop arm 43, secured at one end to the underside of the top 6, is connected to be moved against its bias by the stop button 9, and is provided at the end opposite the end at which it is secured, with a finger 44 which, when depressed, engages an "escape" key 104 of the keypad 100.

A kicker rod 48 is connected at one end to the kicker knob 14. The rod 48 is journaled in a sleeve bearing 49 carried by the crossbeam 32. At its end opposite the knob 14, the kicker rod 48 is pivotally connected to a telescoping lever arm 50, at a place a short distance from an outer end of the arm 50, leaving a short extension 57. The lever arm 50 is received slideably in a tubular arm portion 51 that is pivotally mounted on the crossbeam 32 on a pivot pin 52, as shown in FIGS. 7 and 9, while leaving an outer end portion 53 beyond the pivot pin 52 on the side of the pivot pin 52 away from the lever arm 50. The end portion 53 is pivotally connected to an actuator lever 58, which has a finger 61 positioned to engage a down key 103 when the knob 14 is retracted.

Figure 11:
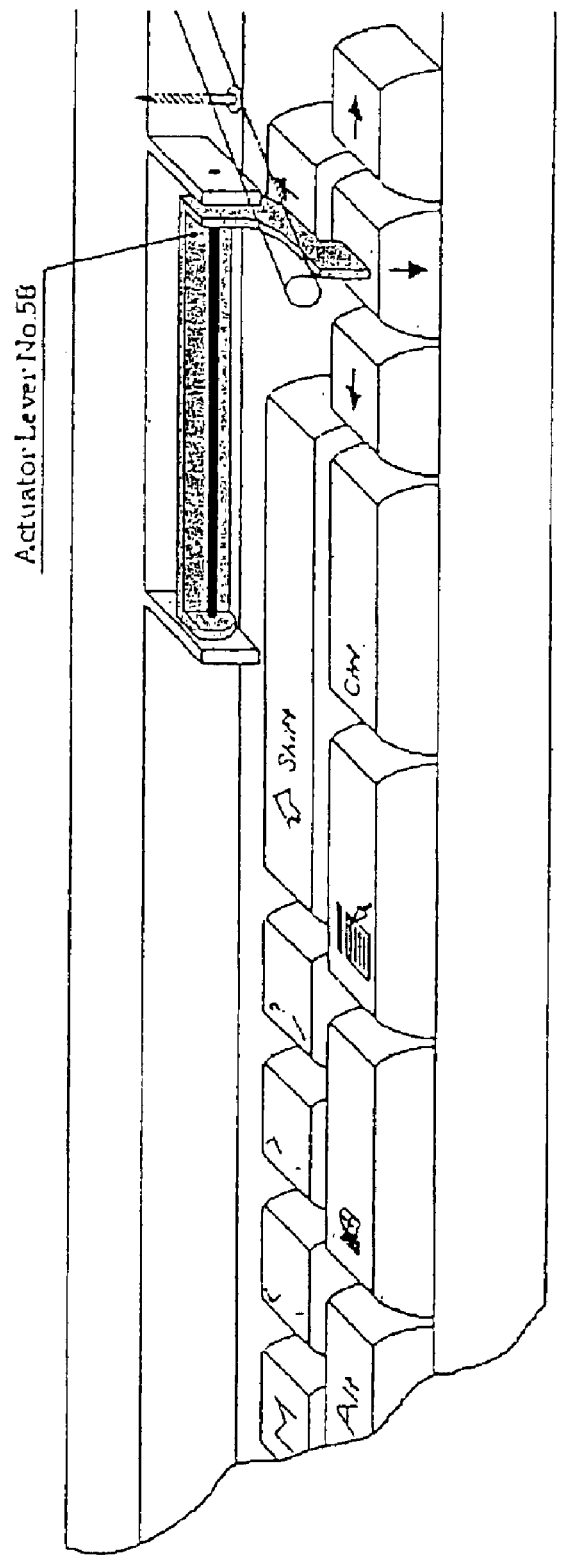
FIG. 11 is a fragmentary view in perspective of a cove portion of the housing in a partly opened position, above a keyboard.

The arm 50, hence the rod 48, is biased to a position in which the kicker knob 14 is against the outer surface of the front wall 12, as shown in FIG. 7, by a spring 56, one end of which is mounted on the extension 57, and the other end of which is mounted on a spring bracket 55, secured to the back wall 19. As shown particularly in FIG. 7, normally the spring 56 biases the lever arm 50 and 51 to move an actuator lever 58 away from a position in which finger 61 engages a "down" key 106 on the keypad 100. The actuator lever 58 is hingedly mounted on a pintle 60 supported by hinge bosses 59 mounted on the crossbar 32. When the ball kicker knob 14 is pulled out to the position shown in FIG. 9, the actuator lever 58 is moved to the position shown in FIG. 11, in which the finger 61 engages the down key 106.

Flipper buttons 16 and 17 are made in such a way as to be biased outwardly, to the positions shown in FIGS. 7 and 9, but to permit their movement inboardly. The button 17 is connected to a flipper button rod 67, which, as shown particularly in FIG. 8, is connected at its end opposite the button 17 to a dogleg lever 68 by means of a pivot pin 70. The dogleg lever is pivoted by a pivot pin 69 to the crossbar 32. A finger 71 projects from the end of the dogleg lever 68. Between the finger 71 and the pivot pin 69, a spring 72 is connected to the lever 68 at one end and, at another end, to a bracket 73 secured to the underside of the cover top wall 6. The finger 71 is positioned to engage the right hand "shift" key 105 of the keypad 100. The length of the rod 67 is dictated by the distance from the edge of the keypad across the one set of keys to the shift key on the right side.

The flipper button 16 is connected to a short "rod" 77, which is pivotally connected to an angled leg 78, pivotally mounted on the crossbar 32. A spring 79, mounted at one end on a bracket secured to the top wall 6, is connected at its other end to a reach of the angled leg 78 on the opposite side of the pivot from the rod 77. The inboard end of the angled leg 78 is positioned to engage the left shift key 106, when the flipper button 16 is pressed inboardly.

A pause button rod 84 is positioned to engage the "P" key 107 of the keypad 100, when the pause button 11 is depressed.

As has been apparent, in the conventional electronic pinball games, the "enter" key is depressed to start the game. The "escape" key stops the game. Shift keys serve as the flipper keys. The "P" key actuates the "pause" function. The "down" key serves the "kicker" function.

The operation of the device is self-evident. By manipulating the various knobs and buttons, the player experiences much of the excitement of a conventional manually operated pinball machine. This is accomplished without any additional electronics or any modification of software.

Numerous variations in the construction of the device of this invention, within the scope of the appended claims will occur to those skilled in the art in the light of the foregoing description. Merely by way of example, as has been indicated, the locations of the various function keys may be the changed for different games, and the mechanisms can be adjusted to accommodate them. As is evident, the travel of the fingers or other mechanisms by which the keys of the keypad are depressed is limited, as by the throw of the lever arms 68 and 78, and of the actuator 58. Other stop means can be utilized to limit the distance through which the various links and levers can move. These are merely illustrative.

Having thus described the invention, what is claimed and desired to be secured by Letters Patent is:

1. A unit for converting a keypad operated electronic pinball machine to a mechanically operated pinball machine, comprising a housing configured and dimensioned to enclose a keypad, said keypad having keys specific to functions of starting and stopping an electronic pin ball game, kicking a "ball", flipping said ball, and tilting the machine to end a turn; mechanisms adapted to engage selected individual of said keys, and knobs extending out of said housing and connected to said mechanisms, whereby said keys are operated by manipulation of said knobs to engage keys that control starting, stopping, kicking and flipping.

2. The unit of claim 1 including a pause button mounted in said housing and manipulatable from outside said housing to depress a key that produces a pause.

3. The unit of claim 1 including a wedge mounted on said housing responsive to sliding movement of said housing relative to said keypad to actuate a "tilt" key.

4. The unit of claim 3 wherein said housing includes a base extending beneath said keypad, a slotted mounting bracket fixed to said base, a hinge pin carried by a cover portion of said housing and extending into the slot in said mounting bracket for sliding movement of said cover portion relative to said base, said wedge being carried by said cover portion, and a spring mounted and connected to bias said cover portion toward a position at which said wedge is disengaged from said tilt key.

\* \* \* \* \*